United States Patent [19]

Schultz

[11] Patent Number: 5,016,944

[45] Date of Patent: May 21, 1991

[54] DISPLAY HUB CAP APPARATUS

[76] Inventor: Francis J. Schultz, 6 Starwood Drive, Lenox, Mass. 01240

[21] Appl. No.: 527,849

[22] Filed: May 24, 1990

[51] Int. Cl.$^5$ .............................................. B60B 7/20
[52] U.S. Cl. ............................... 301/37 N; 301/37 R; 301/108 R
[58] Field of Search ............... 301/37 R, 37 N, 37 P, 301/37 S, 108 R, 108 A, 108 S, 5 B, 5 BA; 40/587

[56] References Cited

U.S. PATENT DOCUMENTS

| | | | |
|---|---|---|---|
| 2,997,977 | 8/1961 | Flynn | 40/587 X |
| 3,005,906 | 10/1961 | Butler, Jr. | 301/37 N |
| 4,179,162 | 12/1979 | Zarlengo | 301/5 B A |
| 4,591,210 | 5/1986 | Nickoladze | 301/5 B A |

*Primary Examiner*—Russell D. Stormer
*Attorney, Agent, or Firm*—Leon Gilden

[57] ABSTRACT

An apparatus wherein a covering hub cap includes a horizontally aligned message display arranged for rotation with the associated automotive wheel during rotation of the wheel, and re-alignment of the horizontal message display upon cessation of the automotive wheel in rotation. A first metallic sphere is captured within the hub cap disk, and further including an elongate cylindrical slot diametrically aligned with the first sphere at an opposed side of the axial center of the hub cap disk rotatably receiving a second sphere therewithin, wherein the second sphere is directed to an outward portion of the slot during rotation of the wheel and directed at a forward position of the slot adjacent the axial center of the disk during stationary positioning of the disk to align the message slot in a horizontal orientation between the first and second spheres.

6 Claims, 4 Drawing Sheets

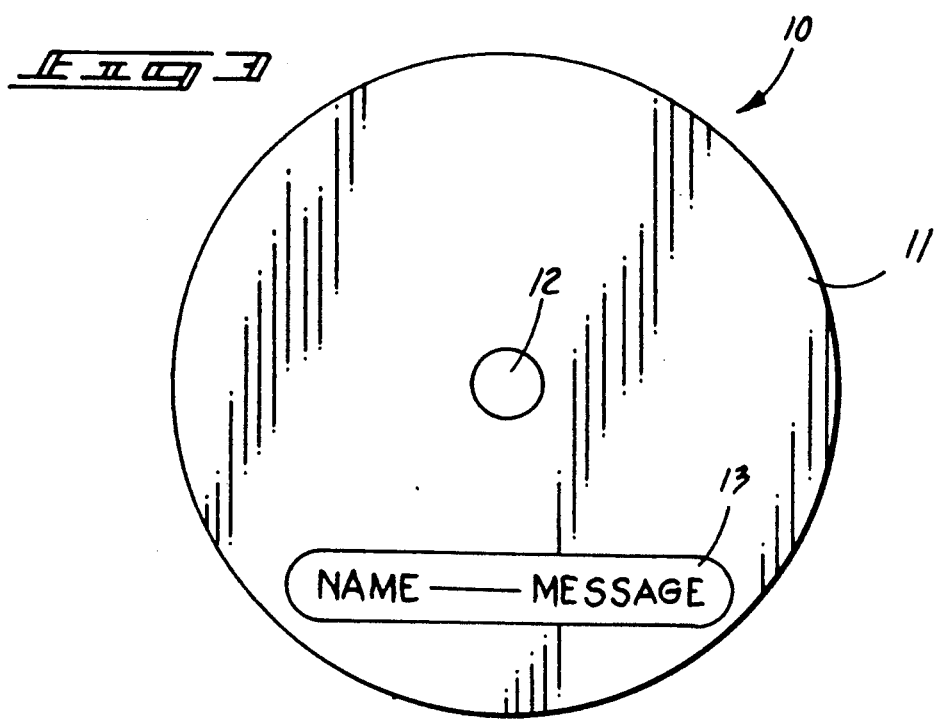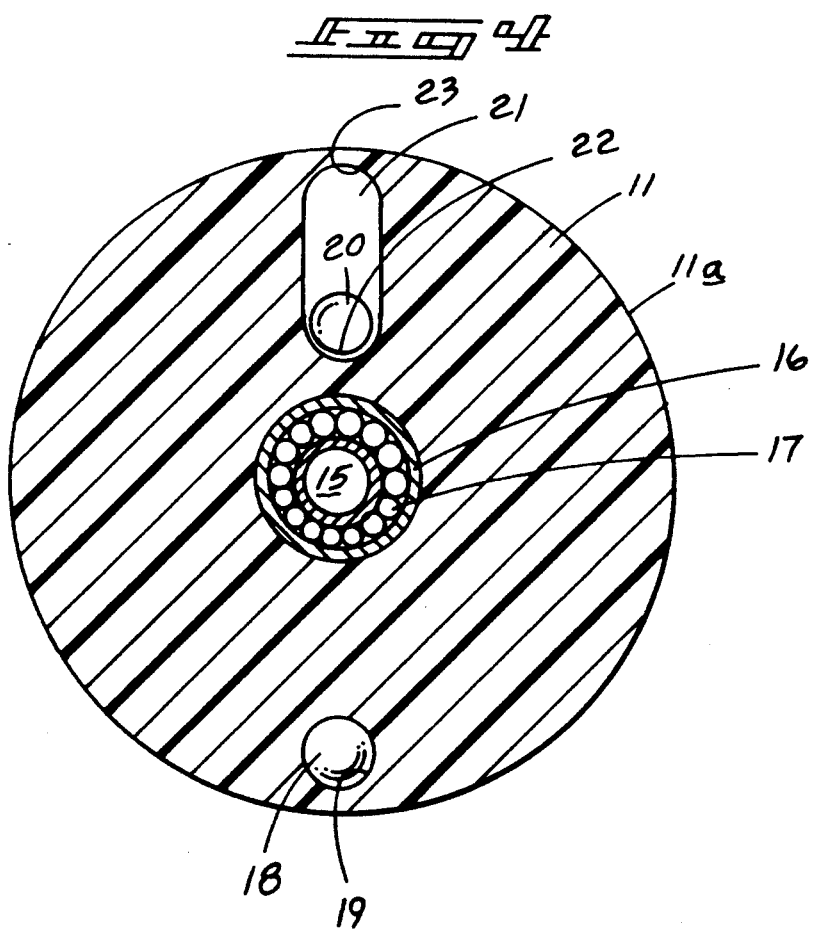

DISPLAY HUB CAP APPARATUS

BACKGROUND OF THE INVENTION

1. Field of the Invention

The field of the invention relates to automotive hub cap structures, and more particularly pertains to a new and improved display hub cap apparatus wherein the same orients a message slot in a horizontal orientation during stationary positioning of the hub cap for display of messages arranged within the slot.

2. Description of the Prior Art

Hub cap apparatus of various types have been utilized throughout the prior art to provide protection and adornment for an interior cylindrical area of an automotive wheel. There have also been attempts in the prior art to provide hub caps that are arranged in a non-rotating or horizontal orientation with reference positioned within the hub cap structure. Examples of such prior art may be found in U.S. Pat. No. 4,280,293 to Kovalenko, et al. wherein the hub cap structure utilizes a enclosed fluid chamber containing a fluid such as mercury therewithin to arrange a hub cap in a relatively stationary position as the hub cap rotates.

U.S. Pat. No. 2,869,262 Lucas sets forth a reel supported sign, wherein the sign is rotatably mounted on a hub cap structure of a wheel utilizing to maintain the hub cap in a horizontal orientation relative to rotation of the wheel.

U.S. Pat. No. 2,782,871 to Schjolin sets forth a wheel structure with a non-rotating hub cap arranged to rotate relative to the wheel to remain in a horizontal orientation for advertising of a message positioned thereon.

U.S. Pat. No. 2,754,154 Solow sets forth a stationary hub cap structure utilizing counter-weighted portion of the hub cap to maintain the hub cap in a stationary position relative to a rotating wheel.

As such, it may be appreciated that there continues to be a need for a new and improved display hub cap apparatus as set forth by the instant invention wherein the same permits rotation of the hub cap during rotation of the wheel and further permits re-orientation of the hub cap in a predetermined relative position relative to the wheel during stationary positioning of the wheel.

SUMMARY OF THE INVENTION

In view of the foregoing disadvantages inherent in the known types of hub cap apparatus now present in the prior art, the present invention provides a display hub cap apparatus wherein the same utilizes a relatively repositionable weighted member arranged within the hub cap to re-orient the hub cap in a predetermined orientation to maintain a horizontal sign mounted on the hub cap in a horizontal orientation during stationary positioning of the associated automotive wheel. As such, the general purpose of the present invention, which will be described subsequently in greater detail, is to provide a new and improved display hub cap apparatus which has all the advantages of the prior art hub cap apparatus and none of the disadvantages.

To attain this, the present invention provides an apparatus wherein a covering hub cap includes a horizontally aligned message display arranged for rotation with the associated automotive wheel during rotation of the wheel, and re-alignment of the horizontal message display upon cessation of the automotive wheel in rotation. A first metallic sphere is captured within the hub cap disk, and further including an elongate cylindrical slot diametrically aligned with the first sphere at an opposed side of the axial center of the hub cap disk rotatably receiving a second sphere therewithin, wherein the second sphere is directed to an outward portion of the slot during rotation of the wheel and directed at a forward position of the slot adjacent the axial center of the disk during stationary positioning of the disk to align the message slot in a horizontal orientation between the first and second spheres.

My invention resides not in any one of these features per se, but rather in the particular combination of all them herein disclosed and claimed and it is distinguished from the prior art in this particular combination of all of its structures for the functions specified.

There has thus been outlined, rather broadly, the more important features of the invention in order that the detailed description thereof follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved display hub cap apparatus which has all the advantages of the prior art hub cap apparatus and none of the disadvantages.

It is another object of the present invention to provide a new and improved display hub cap apparatus which may be easily and efficiently manufactured and marketed.

It is a further object of the present invention to provide a new and improved display hub cap apparatus which is of a durable and reliable construction.

An even further object of the present invention is to provide a new and improved display hub cap apparatus which is susceptible of a low cost of manufacture with regard to both materials and labor, and which accordingly is then susceptible of low prices of sale to the consuming public, thereby making such display hub cap apparatus economically available to the buying public.

Still yet another object of the present invention is to provide a new and improved display hub cap apparatus which provides in the apparatuses and methods of the prior art some of the advantages thereof, while simultaneously overcoming some of the disadvantages normally associated therewith.

Still another object of the present invention is to provide a new and improved display hub cap apparatus wherein the same arranges the hub cap in a vertical alignment relative to the wheel to position a message display upon the wheel in a horizontal orientation relative to the automotive wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken in elevation, of the instant invention. FIG. 4 is a transverse, cross-sectional view of the invention as shown in FIG. 3 illustrating the internal construction thereof.

DESCRIPTION OF THE PREFERRED EMBODIMENT

Figure 1:
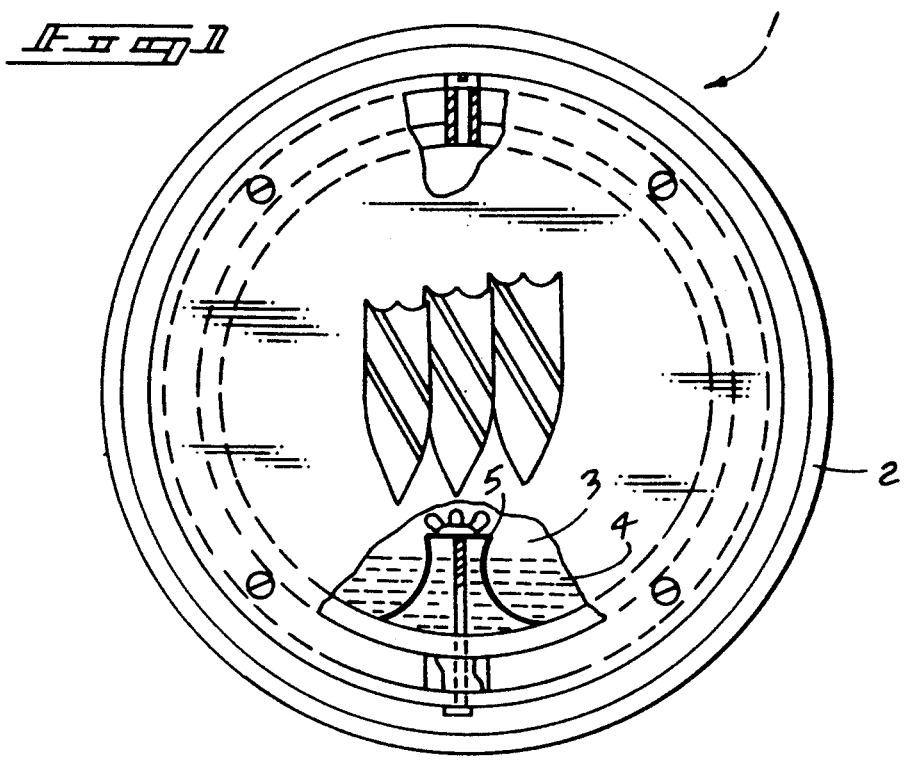
FIG. 1 is an orthographic view, partially in section, of a prior art display hub cap apparatus.

With reference now to the drawings, and in particular to FIGS. 1 to 8 thereof, a new and improved display hub cap apparatus embodying the principles and concepts of the present invention and generally designated by the reference numeral 10 will be described.

Figure 2:
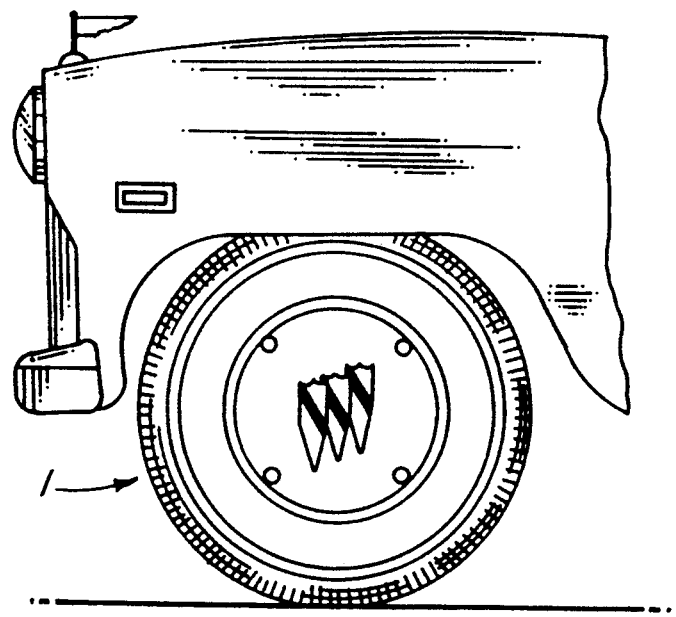
FIG. 2 is an orthographic view, taken in elevation, of the hub cap apparatus as illustrated in FIG. 1 in association with an automotive wheel.

FIG. 1 illustrates a prior art hub cap apparatus 1, wherein the hub cap disk 2 includes a fluid chamber 3, including a quantity of fluid 4 therewithin in association with a damper structure 5 to maintain the fluid 4, such as mercury, within the fluid chamber to maintain horizontal orientation of the hub cap, as illustrated in FIG. 2.

Figure 5:
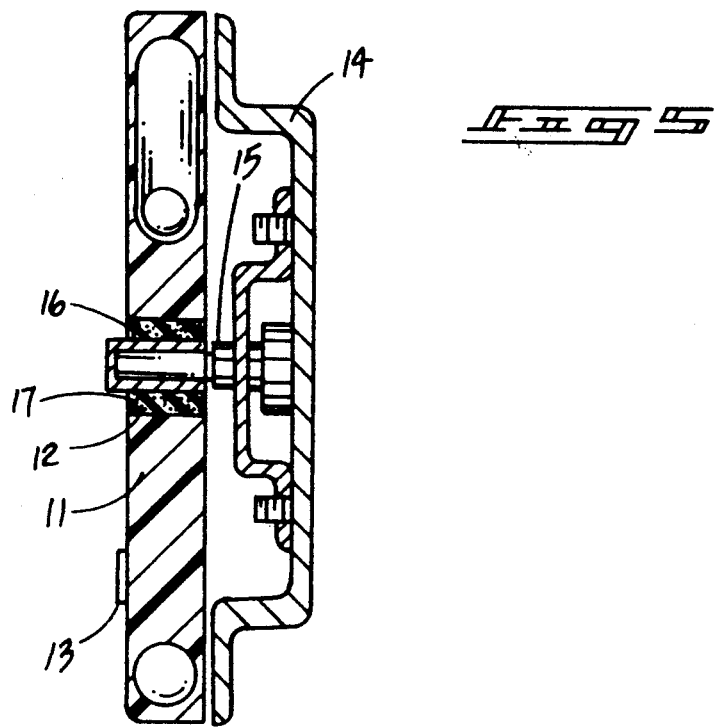
FIG. 5 is an orthographig cross-sectional view of the invention, as illustrated in FIG. 3 illustrating the construction and relationship of various components therewithin.

More specifically, the display hub cap apparatus 10 of the instant invention essentially comprises a cylindrical hub cap disk 11, including a central axial aperture 12 directed orthogonally therethrough. A horizontal message slot 13 is provided defined by a "U" shaped flange 13a (see FIGS. 7 and 8) to receive an associated message therewithin to arrange the message contained within the message slot 13 in orientation when the disk and associated wheel are in a stationary non-rotating orientation. Reference to FIG. 5 illustrates the automotive wheel rim 14, including a wheel axle 15 directed orthogonally relative and through the automotive wheel. A resilient cylindrical sleeve 16 is contained within the axial aperture 12 and captures a bearing 17 between the sleeve and the wheel axle 15 to secure the hub cap disk 11 in a rotating orientation relative to the wheel axle.

A first relatively heavy metal sphere 18 utilizing such metal as mercury, lead, or the like is captured within a complementarily configured spherical cavity 19 that is spaced at a predetermined spacing from the annular perimeter 11a of the disk 11. A second relatively heavy metal sphere 20 is rotatably received and captured within an elongate diametrically aligned cylindrical slot 21 that includes a slot first end 22 positioned adjacent the axial aperture 12, with a second end 23 of the slot positioned adjacent the perimeter 11a of the disk 11 the equal predetermined spacing, as set forth by the spherical cavity 19 and the captured first sphere 18. The cylindrical slot 21 is diametrically aligned with the first sphere 18 on an opposed side of the disk opposite that of the first sphere 18. During rotation of the automotive wheel 14, centrifugal force directs the second sphere to the second end 23 of the cylindrical slot 21 to balance the disk and permit rotation of the disk and the wheel 14. Upon cessation of rotation of the wheel 14, the second sphere 20 is directed towards the first end 22 of the cylindrical slot 21 to align the cylindrical slot 21 and the first sphere 18 in a vertical orientation to arrange the message slot 13 in a horizontal orientation, inasmuch as the message slot 13 is positioned between the axial aperture 12 and the first sphere 18 orthongonally arranged relative to alignment of the cylindrical slot 21 and the first sphere 18 and the spherical cavity 19.

Figure 6:
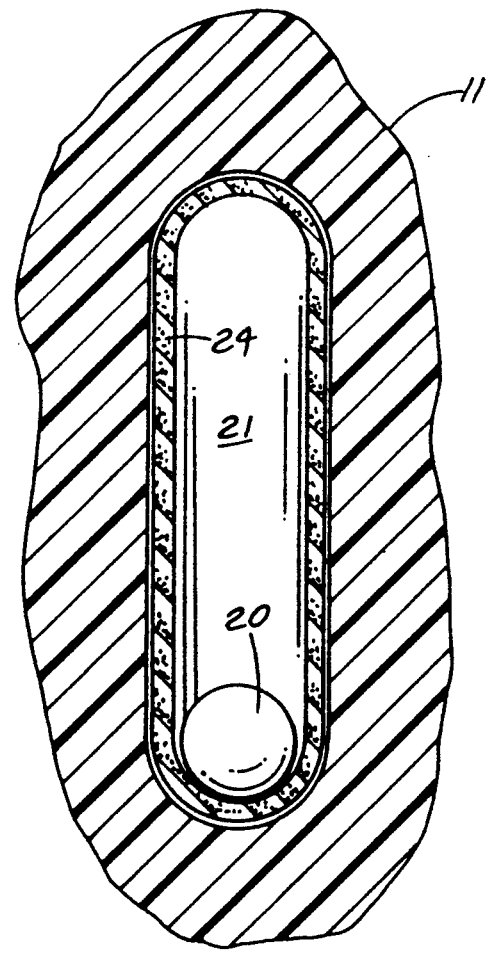
FIG. 6 is an orthographic cross-sectional view, somewhat enlarged, of the spherical slot utilized by the instant invention.
Figure 7:
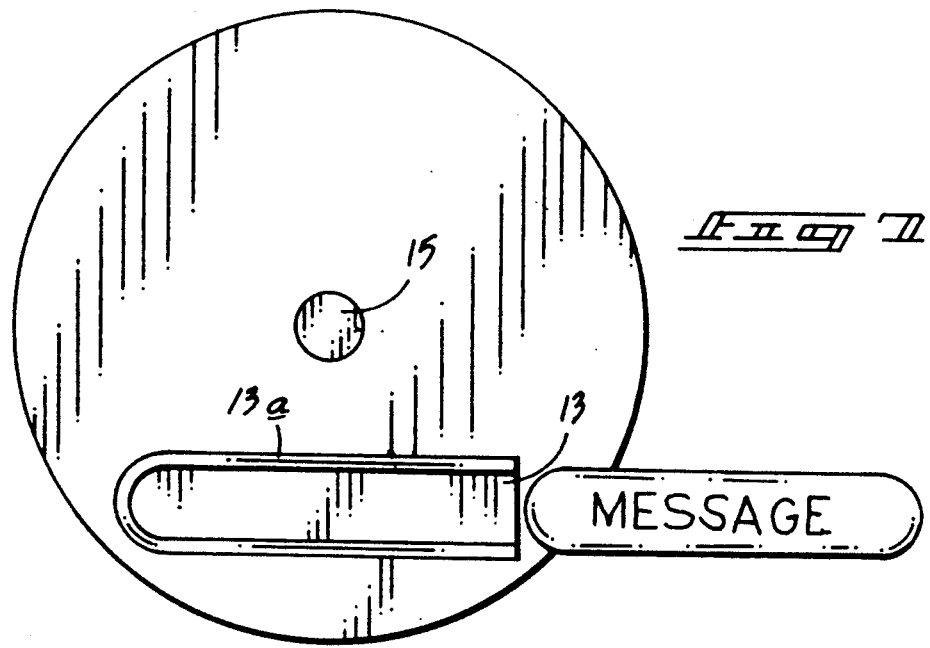
FIG. 7 is an orthographic view of the instant invention, taken in elevation, illustrating relationship of an associated message and the message slot.
Figure 8:
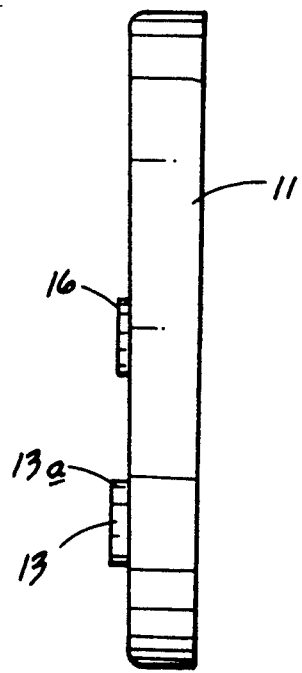
FIG. 8 is an orthographic side view, taken in elevation, of the invention as illustrated in FIG. 7.

FIG. 6 illustrates the cylindrical cavity 21 including a polymeric linear coextensively formed throughout an interior surface of a cylindrical cavity to dampen noise and vibration effected by relative rotation and repositioning of the second metallic sphere 20 within the cylindrical slot 21.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A display hub cap apparatus for securement to an automotive wheel rim, wherein the wheel rim includes a wheel axle projecting coaxially and orthogonally relative to the wheel rim, and wherein the apparatus comprises, a cylindrical hub cap disk, the disk including a central axial aperture directed orthogonally therethrough, and wherein the hub cap disk includes the annular perimeter edge, a message slot mounted on an exterior surface of the hub cap disk between the axial aperture and the annular perimeter edge arranged orthongonally relative to an axis defined by the axial aperture, and a first weighted member mounted within a first cavity, the first cavity defined by a complementary configuration to the first weighted member, and the first cavity positioned between the annular perimeter edge and the message slot a predetermined spacing, and an elongate cavity diametrically aligned with the first weighted member, wherein the elongate cavity includes a second weighted member rotatably mounted therewithin.

2. An apparatus as set forth in claim 1 wherein the elongate cavity is defined by a cylindrical cavity, the cylindrical cavity diametrically aligned with the weighted member, the weighted member defined by a first metallic sphere and the second weighted member defined by a second metallic sphere, the first and second metallic spheres defined by an equal weight, and the cylindrical cavity including an upper terminal end position adjacent the annular perimeter edge the predetermined spacing, and a second end positioned adjacent the axial aperture.

3. An apparatus as set forth in claim 2 wherein the elongate cavity includes a polymeric liner coextensively formed to an interior surface of the cylindrical cavity to dampen noise therewithin during rotation of the second sphere within the cylindrical cavity.

4. An apparatus as set forth in claim 3 wherein the message slot includes a "U" shaped flange positioned about the message slot to receive a message within the "U" shaped flange.

5. An apparatus as set forth in claim 4 wherein the axial aperture includes a resilient cylindrical sleeve positioned within an interior surface of the axial aperture, the cylindrical sleeve securing a bearing within the sleeve, the bearing fixedly secured to the wheel axle to permit relative rotation of the disk relative to the wheel axle.

6. An apparatus as set forth in claim 5 wherein the cylindrical cavity is positioned upon an opposed side of the axial aperture as that defined by the first sphere.

* * * * *